US011954477B2

United States Patent
Takeuchi

(10) Patent No.: US 11,954,477 B2
(45) Date of Patent: Apr. 9, 2024

(54) INFORMATION PROCESSING DEVICE, INFORMATION PROCESSING METHOD, AND PROGRAM

(71) Applicant: FELICA NETWORKS, INC., Tokyo (JP)

(72) Inventor: Yasuo Takeuchi, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 116 days.

(21) Appl. No.: 17/438,788

(22) PCT Filed: Apr. 13, 2020

(86) PCT No.: PCT/JP2020/016250
§ 371 (c)(1),
(2) Date: Sep. 13, 2021

(87) PCT Pub. No.: WO2020/218050
PCT Pub. Date: Oct. 29, 2020

(65) Prior Publication Data
US 2022/0147338 A1 May 12, 2022

(30) Foreign Application Priority Data
Apr. 26, 2019 (JP) ................................. 2019-085373

(51) Int. Cl.
*G06F 8/65* (2018.01)
*G06F 9/4401* (2018.01)
(Continued)

(52) U.S. Cl.
CPC ............. *G06F 8/65* (2013.01); *G06F 9/4406* (2013.01); *G06F 21/71* (2013.01); *G06F 21/77* (2013.01); *H04L 67/34* (2013.01)

(58) Field of Classification Search
CPC .................................. G06F 8/65; G06F 9/4406
(Continued)

(56) References Cited

U.S. PATENT DOCUMENTS

| 5,793,970 A | 8/1998 | Fakes | |
|---|---|---|---|
| 2009/0256731 A1 * | 10/2009 | Matsuo | G06F 16/258 341/51 |

(Continued)

FOREIGN PATENT DOCUMENTS

| EP | 2615867 A1 * | 7/2013 | ............ H04W 48/02 |
|---|---|---|---|
| JP | 2008-504759 A | 2/2008 | |

(Continued)

OTHER PUBLICATIONS

Madlmayr, Gerald, et al., NFC Devices: Security and Privacy, The Third International Conference on Availability, Reliability and Security, 2008, 6 pages, [retrieved on Nov. 30, 2023], Retrieved from the Internet: <URL:http://ieeexplore.ieee.org/>.*

(Continued)

*Primary Examiner* — Geoffrey R St Leger
(74) *Attorney, Agent, or Firm* — Paratus Law Group, PLLC

(57) ABSTRACT

The present disclosure relates to an information processing device, an information processing method, and a program capable of suppressing labor and cost for generating a unique identifier. According to the present disclosure, provided is an information processing device provided with software in which first identification information having uniqueness is registered, and an application that obtains the first identification information from the software, converts the first identification information into second identification information having uniqueness for communication, and registers the second identification information in the software.

(Continued)

7byte ISO-14443 Double UID

| UID0 | UID1 | UID2 | UID3 | UID4 | UID5 | UID6 |
|---|---|---|---|---|---|---|
| 0xAA | UID 1: ORDINATE OF PHYSICAL POSITION INFORMATION FROM WAFER CENTER OF CORRESPONDING CHIP<br>UID 2: ABSCISSA OF PHYSICAL POSITION INFORMATION FROM WAFER CENTER OF CORRESPONDING CHIP<br>UID 3: ISSUANCE COUNT AT FOLLOWING SPECIFIC DATE OF WAFER<br>UID 4: WAFER MANUFACTURING DEVICE NUMBER<br>UID 5: WAFER MANUFACTURE DATE (YEAR/MONTH)<br>UID 6: WAFER MANUFACTURE DATE (DAY) | | | | | |

IDm format

| D0 | D1 | D2 | D3 | D4 | D5 | D6 | D7 |
|---|---|---|---|---|---|---|---|
| MANUFACTURER CODE ASSIGNED BY COMPANY/ ORGANIZATION FOR EXAMPLE) 0x3210 | | UID1 TO DID6 ARE USED FOR D2 TO D7 WITHOUT CHANGE | | | | | |

With this configuration, it is possible to suppress labor and cost for generating a unique identifier.

14 Claims, 8 Drawing Sheets

(51) Int. Cl.
    *G06F 21/71*     (2013.01)
    *G06F 21/77*     (2013.01)
    *H04L 67/00*     (2022.01)

(58) Field of Classification Search
    USPC .......................................................... 717/170
    See application file for complete search history.

(56) References Cited

U.S. PATENT DOCUMENTS

| | | | |
|---|---|---|---|
| 2011/0078455 A1* | 3/2011 | Zhu | G06Q 20/355 713/182 |
| 2015/0370745 A1 | 12/2015 | Eckerdt | |
| 2016/0234185 A1* | 8/2016 | Ito | G11B 20/1258 |
| 2019/0130375 A1* | 5/2019 | Nakai | G06Q 20/322 |

FOREIGN PATENT DOCUMENTS

| | | | | |
|---|---|---|---|---|
| JP | 2010-039747 A | 2/2010 | | |
| JP | 2015207217 A | 11/2015 | | |
| WO | WO 2013/179791 A1 | 12/2013 | | |
| WO | WO-2014196969 A1 * | 12/2014 | ......... | G06Q 20/3223 |

OTHER PUBLICATIONS

Java Card, Wikipedia, 2018, 5 pages, [retrieved on Nov. 30, 2023], Retrieved from the Internet: <URL:https://web.archive.org/web/20181221223654/https://en.wikipedia.org/wiki/Java_Card>.*

* cited by examiner

FIG. 1
| UID0 | UID1 | UID2 | UID3 | UID4 | UID5 | UID6 |
FIG. 2
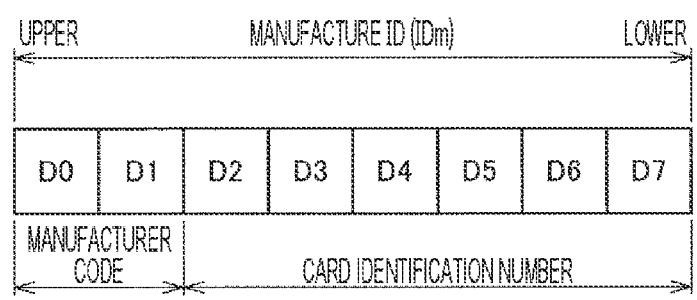
FIG. 3
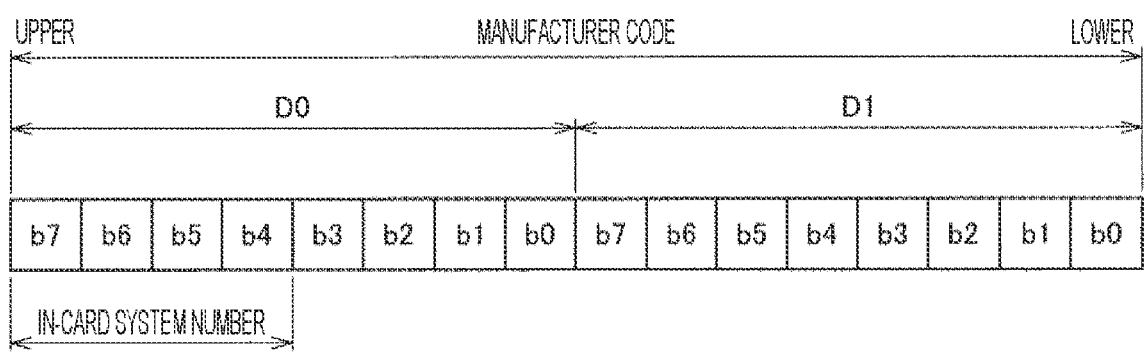

FIG. 4

7byte ISO-14443 Double UID

| UID0 | UID1 | UID2 | UID3 | UID4 | UID5 | UID6 |
|------|------|------|------|------|------|------|
| 0xAA | UID 1: ORDINATE OF PHYSICAL POSITION INFORMATION FROM WAFER CENTER OF CORRESPONDING CHIP<br>UID 2: ABSCISSA OF PHYSICAL POSITION INFORMATION FROM WAFER CENTER OF CORRESPONDING CHIP<br>UID 3: ISSUANCE COUNT AT FOLLOWING SPECIFIC DATE OF WAFER<br>UID 4: WAFER MANUFACTURING DEVICE NUMBER<br>UID 5: WAFER MANUFACTURE DATE (YEAR/MONTH)<br>UID 6: WAFER MANUFACTURE DATE (DAY) | | | | | |

IDm format

| D0 | D1 | D2 | D3 | D4 | D5 | D6 | D7 |
|----|----|----|----|----|----|----|----|
| MANUFACTURER CODE ASSIGNED BY COMPANY/ORGANIZATION (FOR EXAMPLE) 0x3210 | | UID1 TO DID6 ARE USED FOR D2 TO D7 WITHOUT CHANGE | | | | | |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/016250 (filed on Apr. 13, 2020) under 35 U.S.C. § 371, which claims priority to Japanese Patent Application No. 2019-085373 (filed on Apr. 26, 2019), which are all hereby incorporated by reference in their entirety.

TECHNICAL FIELD

The present disclosure relates to an information processing device, an information processing method, and a program.

BACKGROUND ART

Conventionally, for example, following Patent Document 1 discloses a method of reusing identification data from an identification module in user equipment by a peripheral device.

CITATION LIST

Patent Document

Patent Document 1: Japanese Unexamined Patent Publication No. 2008-504759

SUMMARY OF THE INVENTION

Problems to be Solved by the Invention

For example, an identifier for uniquely identifying a secure element is required for quality control and defect analysis in a market. However, in order to generate a unique identifier, there is a problem that labor and cost are required. Moreover, when the secure element performs contactless communication prescribed in ISO 14443, ISO 18092 and the like with the outside, if a unique identifier regarding the communication is separately provided, labor and cost for generating the identifier are problematically doubled. Furthermore, in a case where the secure element employs a plurality of communication systems and uses a unique identifier for each system, it takes labor and cost for each system.

Therefore, it has been required to suppress the labor and cost for generating the unique identifier.

Solutions to Problems

According to the present disclosure, provided is an information processing device provided with software in which first identification information is registered, and an application that obtains the first identification information from the software, converts the first identification information into second identification information for communication, and registers the second identification information in the software.

The application may convert the first identification information into the second identification information by removing a part of information from the first identification information and newly assigning another code prescribed in a format of the second identification information.

Furthermore, the application may convert the first identification information into the second identification information by transferring information other than the part of information out of the first identification information to the second identification information without change.

Furthermore, the part of information may be identification information that assigns uniqueness under a specific environment by adding the part of information.

Furthermore, the part of information may include identification information numbered for identifying a chip manufacturer, identification information numbered for identifying a company that develops an operation system, identification information numbered for identifying a company that operates a service, identification information numbered for identifying a company entrusted with operation, identification information assigned for identifying an international communication standard, or identification information assigned for providing uniqueness under an environment including a specific country, region, or company.

Furthermore, information remained after removing the part of information may be information for ensuring uniqueness under a specific environment, and may be identification information numbered to implement uniqueness by incorporating at least any one of a specific law, a physical law, a physical phenomenon, position information, and time information.

Furthermore, the software may be a Java (registered trademark) Card operation service (OS), and the application may register the second identification information in a contactless registry service that manages contactless information included in the JavaCard OS.

Furthermore, the application may register a system code for identifying a service or identification information for indicating a standby time together with the second identification information in the contactless registry service.

Furthermore, the application may convert the first identification information as original data into predetermined information, and generate the second identification information from the predetermined information.

Furthermore, the application may be downloadable on the software.

Furthermore, the first identification information and the second identification information may have uniqueness.

Furthermore, the software may be an operating system, firmware, or kernel.

Furthermore, according to the present disclosure, provided is an information processing method provided with obtaining, from software in which first identification information is registered, the first identification information, converting the first identification information into second identification information for communication, and registering the second identification information in the software.

Furthermore, according to the present disclosure, provided is a program that allows a computer to serve as a means that obtains, from software in which first identification information is registered, the first identification information, a means that converts the first identification information into second identification information for communication, and a means that registers the second identification information in the software.

BRIEF DESCRIPTION OF DRAWINGS

FIG. 1 is a schematic diagram illustrating a byte sequence of an UID.

FIG. 2 is a schematic diagram illustrating a byte sequence of an IDm.

FIG. 3 is a schematic diagram illustrating a configuration of a manufacturer code.

FIG. 4 is a schematic diagram illustrating an example of conversion from the UID to the IDm.

MODE FOR CARRYING OUT THE INVENTION

Figure 5A:
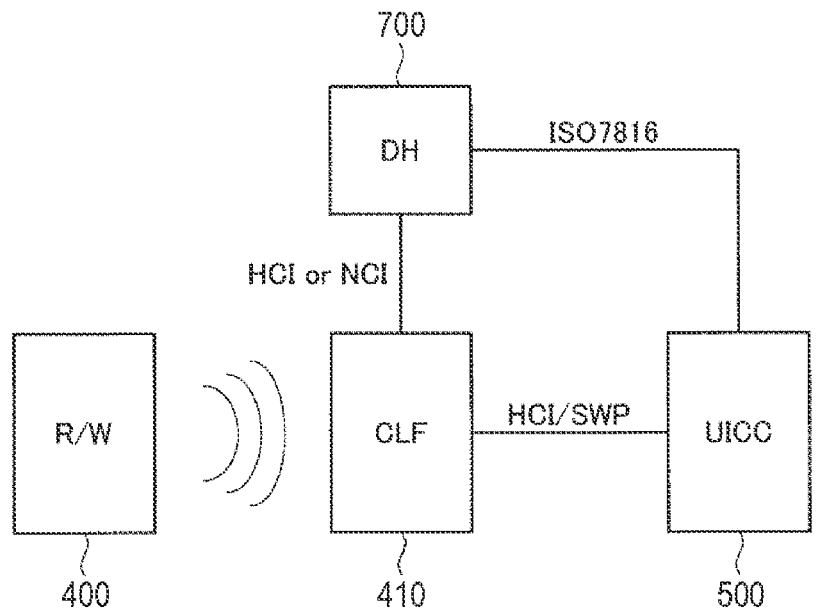
FIG. 5A is a schematic diagram illustrating a variation of a connection configuration of a secure element.

A preferred embodiment of the present disclosure is hereinafter described in detail with reference to the accompanying drawings. Note that, in this specification and the drawings, the components having substantially the same functional configuration are assigned with the same reference sign and the description thereof is not repeated.

Note that, the description is given in the following order.
1. Outline
2. Regarding UID
3. Regarding IDm.
4. Example of conversion from UID to IDm
5. Connection configuration of secure element
6. Software configuration of secure element
7. Procedure for generating IDm from UID
1. Outline The present disclosure is preferably applied to, for example, a secure element (SE: hereinafter referred to as SE) that holds a parameter required for contactless communication. In order to perform the contactless communication prescribed in ISO 14443, ISO 18092 and the like, an identifier for uniquely identifying the SE is required. In this embodiment, by applying the identifier to a plurality of communication protocols, labor and cost for generating a unique identifier are reduced. Specifically, in this embodiment, a part of a UID prescribed in ISO 14443 is reused as a part of an IDm prescribed in ISO 18092.

The secure element is included in an information processing device that communicates with a reader/writer in a contactless manner. As the information processing device, a mobile terminal, a card, a wearable device, a television, and a personal computer are assumed. Furthermore, as the card, for example, a card having a contactless function such as a transportation card or an electronic money card is assumed. As the wearable device, a device having a clock function or a device used for a locker key and the like are assumed.

When the reader/writer communicates with the information processing device, the reader/writer sends a polling command to the information processing device, and the information processing device returns a polling response to the reader/writer.

2. Regarding UID

The unique identifier (UID) prescribed in ISO 14443 is identification information unique to the information processing device. As a length of the UID, a single UID (specifically has a length of four bytes), a double UID (specifically has a length of seven bytes), and a triple UID (specifically has a length of ten bytes) are prescribed, and there is a room for extension if a numerical range becomes insufficient due to future extendability. The UID is prescribed as any one of a unique value set in advance, a random number dynamically generated by the information processing device (allowed only for the single UID), and a non-unique fixed number (allowed only for the single UID). In this embodiment, a case of the double UID in the example of the unique value set in advance is described as an example.

FIG. 1 is a schematic diagram illustrating a byte sequence of the UID. As illustrated in FIG. 1, in a case of the double UID, the UID includes seven bytes from UID0 to UID6. According to ISO 14443, a first byte UID0 is assigned for each manufacturer, and is prescribed as ensuring uniqueness of the manufacturer. Furthermore, each manufacturer sets a unique value by taking uniqueness of other byte values (UID1 to UID6). By configuring the UID in this manner, each UID has uniqueness.

3. Regarding IDm

FIG. 2 is a schematic diagram illustrating a byte sequence of the IDm. The IDm being an ID for the reader/writer to identify the information processing device with which this communicates is a byte sequence including eight bytes continuous from a next byte of a response code of the polling response returned by the information processing device that receives the polling command, and is a number numbered by a business operator that manufactures the secure element included in the information processing device. By setting the IDm in a parameter of the command, the reader/writer may specify the information processing device of the same IDm and perform communication. In other words, the IDm has a function of an identifier for identifying the information processing device in a communication protocol.

Values of upper two bytes of the IDm are referred to as a manufacturer code being an identification number for identifying the manufacturer, and following six bytes are referred to as a card identification number being an identification number for uniquely identifying the card. Furthermore, in a case where there is a plurality of systems (in a case of emulating a specific service by each applet to be described later, corresponding to the number of applets) in the card, the IDm is set for each system. In this case, upper four bits of the manufacturer code indicate an in-card system number. Note that, although a case where the information processing device is the card is herein described as an example, the same applies to a case of the portable terminal and a case of the wearable device.

FIG. 3 is a schematic diagram illustrating a configuration of the manufacturer code. For the manufacturer code in which a lower one byte is FEh, a system of the card identification number is prescribed. A system vendor numbers other values for a card manufacturer (that assigns the IDm), and the card manufacturer assigns the card identification number to each card according to the system prescribed by the card manufacturer. Therefore, each IDm has uniqueness.

A system code (SC) is a two-byte value included in the polling command for specifying the system, and is assigned for each business operator and each purpose of use. For example, the system code specifies services such as a fare prepaid service in a transportation business and electronic money used in a usage fee prepaid service in a convenience store or a supermarket. Note that although a case where consideration is paid in advance as the electronic money is described, the present invention is also applicable to a wide variety of services such as a service such as a credit card to be settled later, and a payment service using a point or electronic information usable as consideration immediately managed by a server via a network, and is not limited to a specific service. The reader/writer specifies the system code in the parameter of the polling command, and a card with the same system code returns the polling response. In other words, when the reader/writer sends the polling command, this sends the system code in order to determine whether or not the card has a specific system. Only the card having the specific system defined by the system code returns the IDm. As is described later, the polling response includes the IDm, SC, and PMm.

4. Example of Conversion from UID to IDm

FIG. 4 is a schematic diagram illustrating an example of conversion from the UID to the IDm according to this embodiment. In general, chip vendors pay a lot of effort for uniquely numbering the UID. Depending on the system, there is a method of collectively delivering the UIDs and reconfirming whether the values are appropriately set, or a method of preventing overlapping by including physical wafer position information or a wafer number in the UID. There are various numbering methods depending on how the chip vendor generates the UID, but any method requires labor to generate a unique value. Similarly, it takes labor to uniquely generate the IDm.

In an upper diagram in FIG. 4, a method for uniquely numbering six bytes of the UID (UID1 to UID6) is illustrated. FIG. 4 illustrates an example of preventing the overlapping with physical position information from the center of the secure element in the wafer device (bytes 1 and 2), the wafer number (byte 3), a wafer manufacturing device number (byte 4), and values indicating a wafer manufacture date as numerical values (bytes 5 and 6). Chips numbered in this manner have different UIDs. Note that, the method herein illustrated is an example, and six bytes of the UID ensure the uniqueness by various methods.

As for the IDm, similarly, since uniqueness is basically required for the chip vendor, if the uniqueness is required for both the UID and the IDm by a similar method, twice the man-hour is required.

Therefore, in this embodiment, as illustrated in FIG. 4, by applying information of UID1 to UID6 to D2 to D7 in an IDm format, respectively, IDm values may ensure the uniqueness without change.

As described above, UID0 is the ID indicating a specific manufacturer, and ensure identity of the manufacturer. Furthermore, the IDm values D0 and D1 serve as the manufacturer code, and ensure the identity of the manufacturer. Therefore, by switching UID0 to D0 and D1, identity of a product may be ensured in a number system assigned by the same manufacturer.

As described above, in this embodiment, when converting from the UID to the IDm, UID0 that is the ID of the manufacturer is removed from the UID, and the manufacturer code D0 and D1 of the IDm values is newly added. In contrast, the information of UID2 to UID6 is applied to D2 to D7 in the IDm format, respectively, without change. Therefore, it becomes possible to convert from the UID to the IDm by simple processing.

As described above, each manufacturer ensures the uniqueness of other byte values (UID1 to UID6) except UID0. Therefore, by applying UID1 to UID6 to D2 to D7 in the IDm format, respectively, the uniqueness of the IDm may be ensured.

5. Connection Configuration of Secure Element

FIGS. 5A to 5D are schematic diagrams illustrating variations of a connection configuration of the secure element. FIGS. 5A to 5D illustrate the secure element wirelessly connected to a reader/writer 400. More specifically, in FIGS. 5A to 5D, the configurations other than the reader/writer 400 is formed in the information processing device.

In FIG. 5A, a contactless frontend (CLF) 410 is a chip having a wireless function. The contactless frontend (CLF) 410 collectively performs RF side processing such as A/D conversion. A UICC 500 being the secure element is configured by a SIM card. The UICC 500 ensures a communication function with a base station and performs authentication.

Figure 5B:
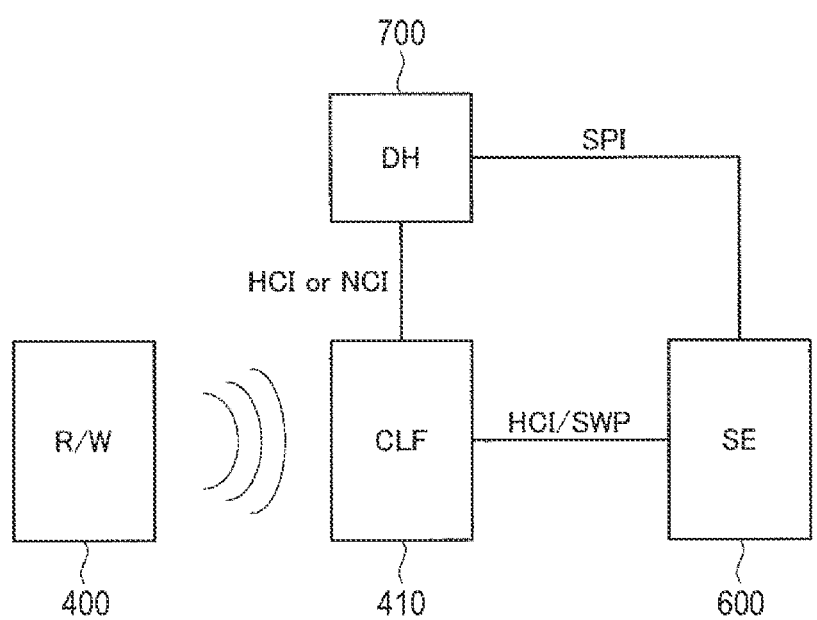
FIG. 5B is a schematic diagram illustrating a variation of the connection configuration of the secure element.

FIG. 5B illustrates a configuration example obtained by removing the communication function from the UICC 500 in FIG. 5A. A configuration of a secure element (SE) 600 is obtained by removing the communication function from the UICC 500. Other configurations in FIG. 5B are similar to those in FIG. 5A.

Figure 5C:
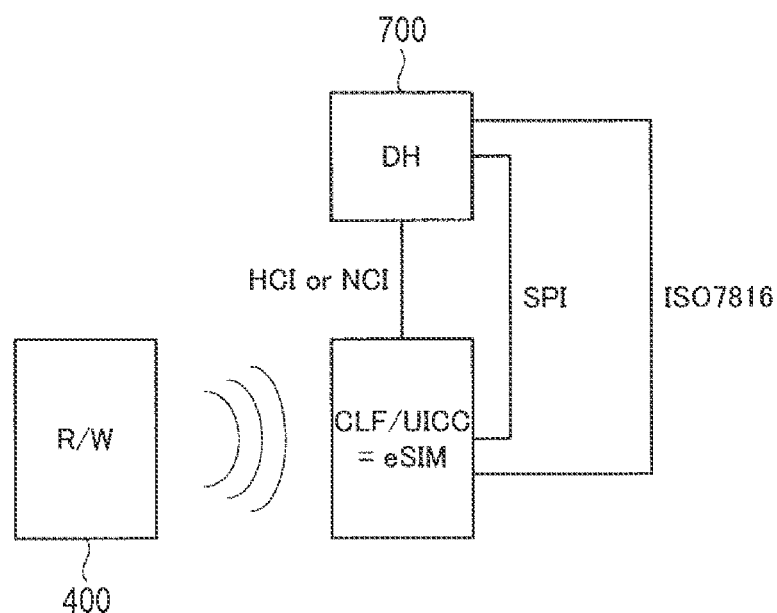
FIG. 5C is a schematic diagram illustrating a variation of the connection configuration of the secure element.
Figure 5D:
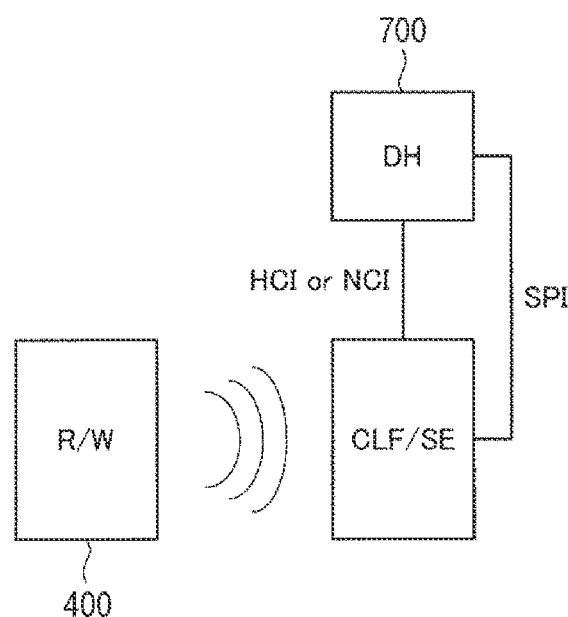
FIG. 5D is a schematic diagram illustrating a variation of the connection configuration of the secure element.
Figure 5E:
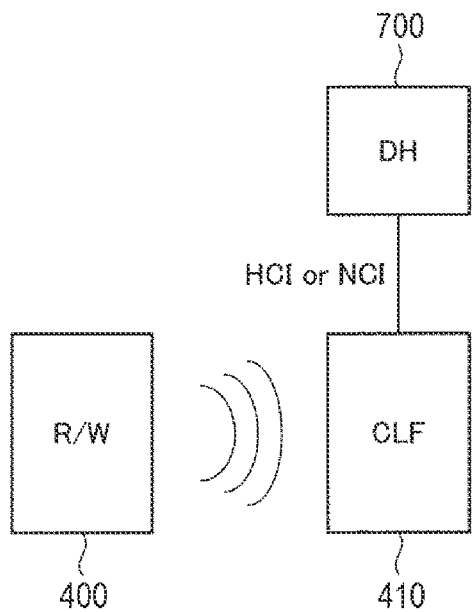
FIG. 5E is a schematic diagram illustrating an example in which a CLF is configured alone without the secure element provided.

FIG. 5C is a configuration example in which the CLF 410 and the UICC 500 in FIG. 5A are integrated. FIG. 5D is a schematic diagram illustrating an example in which the CLF 410 and the SE 600 in FIG. 5B are integrated. FIG. 5E is a schematic diagram illustrating an example in which the CLF 410 is configured alone without the SE 600 in FIG. 5B provided.

As illustrated in FIG. 5E, the method according to this embodiment is also applicable to firmware or a kernel deployed on the CLF in addition to the SE. Furthermore, a program corresponding to an applet 106 does not need to be separated from an operating system (JavaCard OS 104 to be described later) such as a program on the firmware and kernel, and may be included as the program in the operating system. For example, in a case of a configuration including a mobile terminal (DH) that performs host card emulation (HCE) and the CLF, there is no SE, but the IDm for ISO 18092 may be generated from the UID held by the CLF. In contrast, uniqueness in a tamper resistant device such as especially the SE is linked to a global mechanism such as social ID management and passport, and social responsibility is heavy in a case where value overlapping occurs. Therefore, it is assumed that double check or triple check is performed for preventing the overlapping, and that a cost is higher than that in general numbering in examinations. Therefore, especially in the SE, by converting from the UID to the IDm by the method of this embodiment, it is possible to ensure that there is no overlapping and to suppress the cost required for numbering.

Furthermore, in FIGS. 5A to 5D, a DH 700 is a device host and has a function of a mobile terminal. The DH 700 is connected to the SE by ISO 7816 or SPI.

6. Software Configuration of Secure Element

Figure 6:
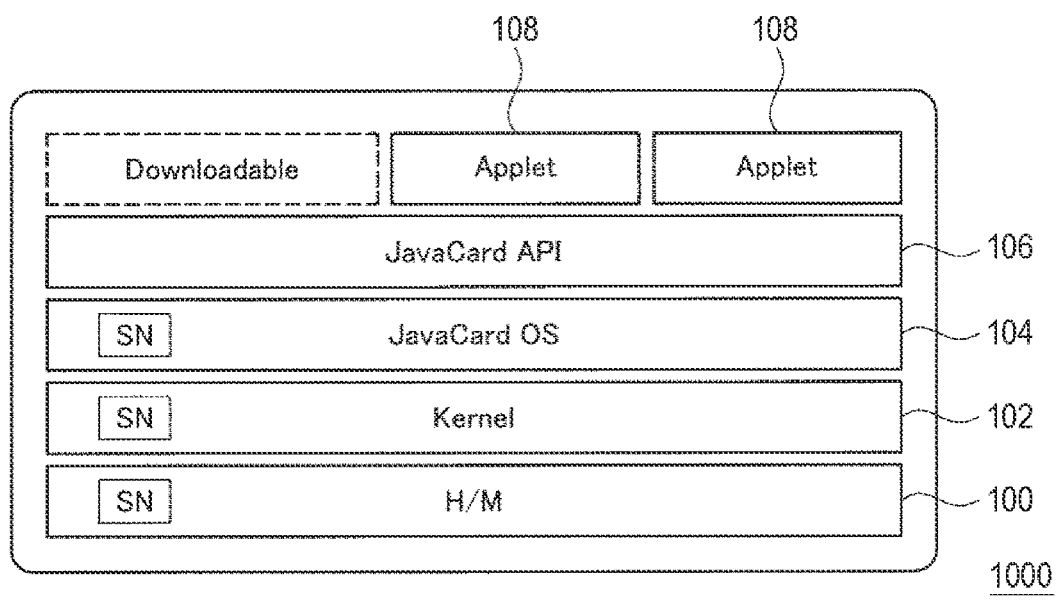
FIG. 6 is a schematic diagram illustrating a configuration of the secure element.

FIG. 6 is a schematic diagram illustrating a software configuration (configuration of the secure element) of an information processing device 1000 according to this embodiment. As illustrated in FIG. 6, hardware (H/W) 100, kernel 102, the JavaCard OS 104, a JavaCard API 106, and the applet 108 are layered in this order from a lower layer. The hardware 100 includes a CPU, a memory and the like, and has a configuration in which they are connected to each other via a bus. The applet 108 is an application (program) downloadable as appropriate, the program that operates in an intermediate language of a JavaCard. The JavaCard OS 104 serves as software, that is, an operating system (OS), and the applet 108 is layered thereon via the JavaCard API 106. Note that the operating system is an example of software, and the software may be the firmware or kernel. "Downloadable" FIG. 6 indicates that other applets are downloadable.

Figure 7:
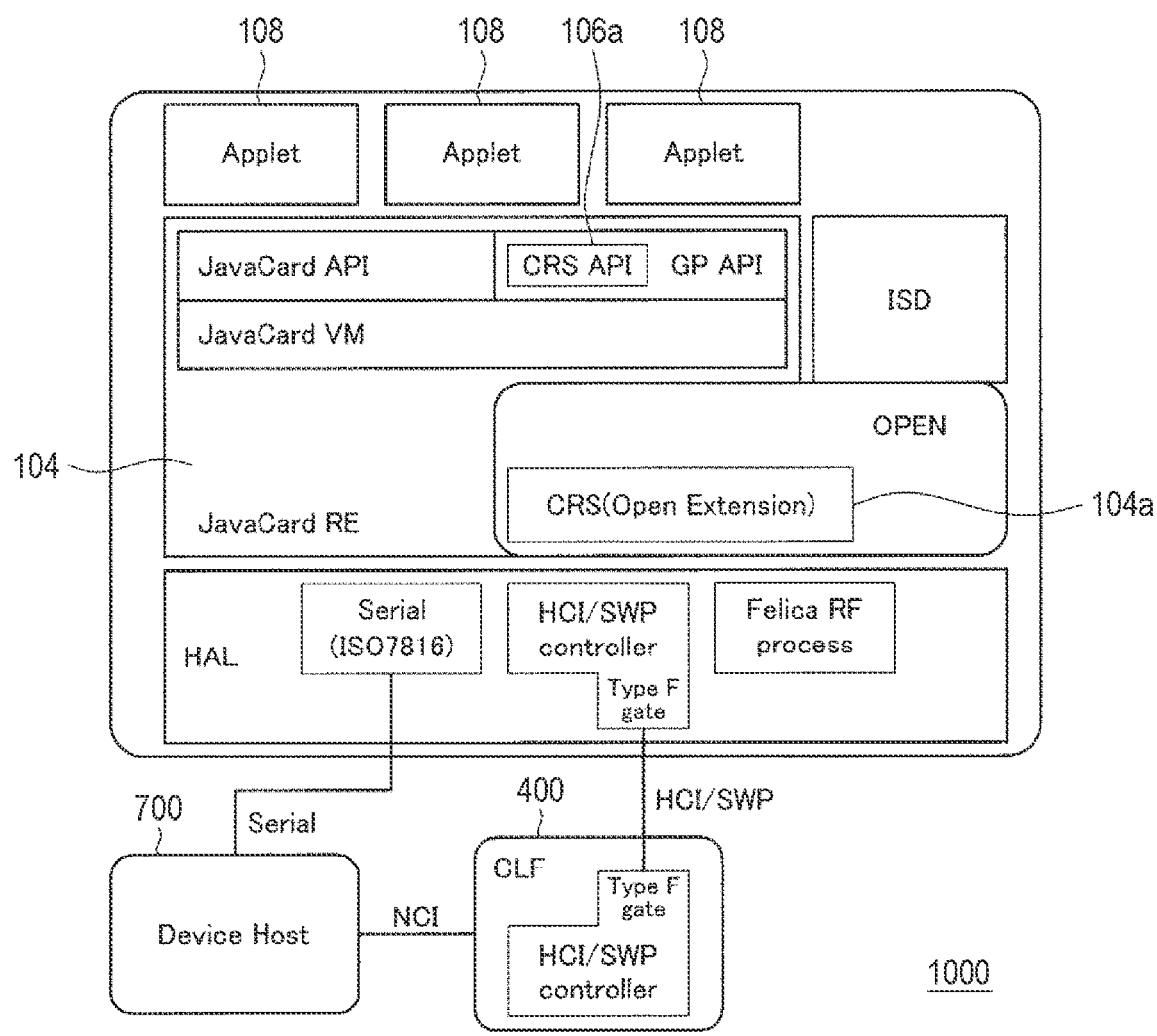
FIG. 7 is a schematic diagram illustrating a software layer in detail in the configuration illustrated in FIG. 6.

FIG. 7 is a schematic diagram illustrating the configuration of the information processing device 1000 according to this embodiment in further detail. In detail, the JavaCard OS 104 includes a JavaCard runtime environment (RE) and a JavaCard vitual machine (VM), and the JavaCard RE is provided with a contactless registry service (CRS (open extension)) 104a as a configuration that ensures a management function. Furthermore, the JavaCard API 106 is provided with a CRS API 106a.

The CRS 104a manages information of the applet 108, and extends the management function indicated as "OPEN" in FIG. 7 while specializing the same in a parameter management function used for the contactless communication with the reader/writer. Note that the management function (OPEN) of the JavaCard OS 104 is prescribed by an organization called as GlobalPlatform. The management function (OPEN) mainly manages information regarding the applet 108, and the information managed by the management function (OPEN) includes an application identifier (ID), presence or absence of the contactless function, key information, an occupied memory size, package information and the like.

The CRS API 106a is the API for the applet 108 to make contact with the CRS 104a. The applet 108 may set data in the CRS 104a for communicating with the outside through the contactless frontend (CLF) 410 via the API 106a.

The CLF 410 for wirelessly connecting to the outside is connected to the DH 700 having a function of a mobile terminal. Note that the UICC (not illustrated in FIG. 7) is responsible for a call function.

When the command is received from the external reader/writer 400, the CLF 410 interprets the same and transfers data to the UICC 500 or the SE 600. Note that the SE 600 is connected to the DH 700 by another communication protocol (ISO) 7816, SPI, or UART).

7. Procedure for Generating IDm from UID

Figure 8:
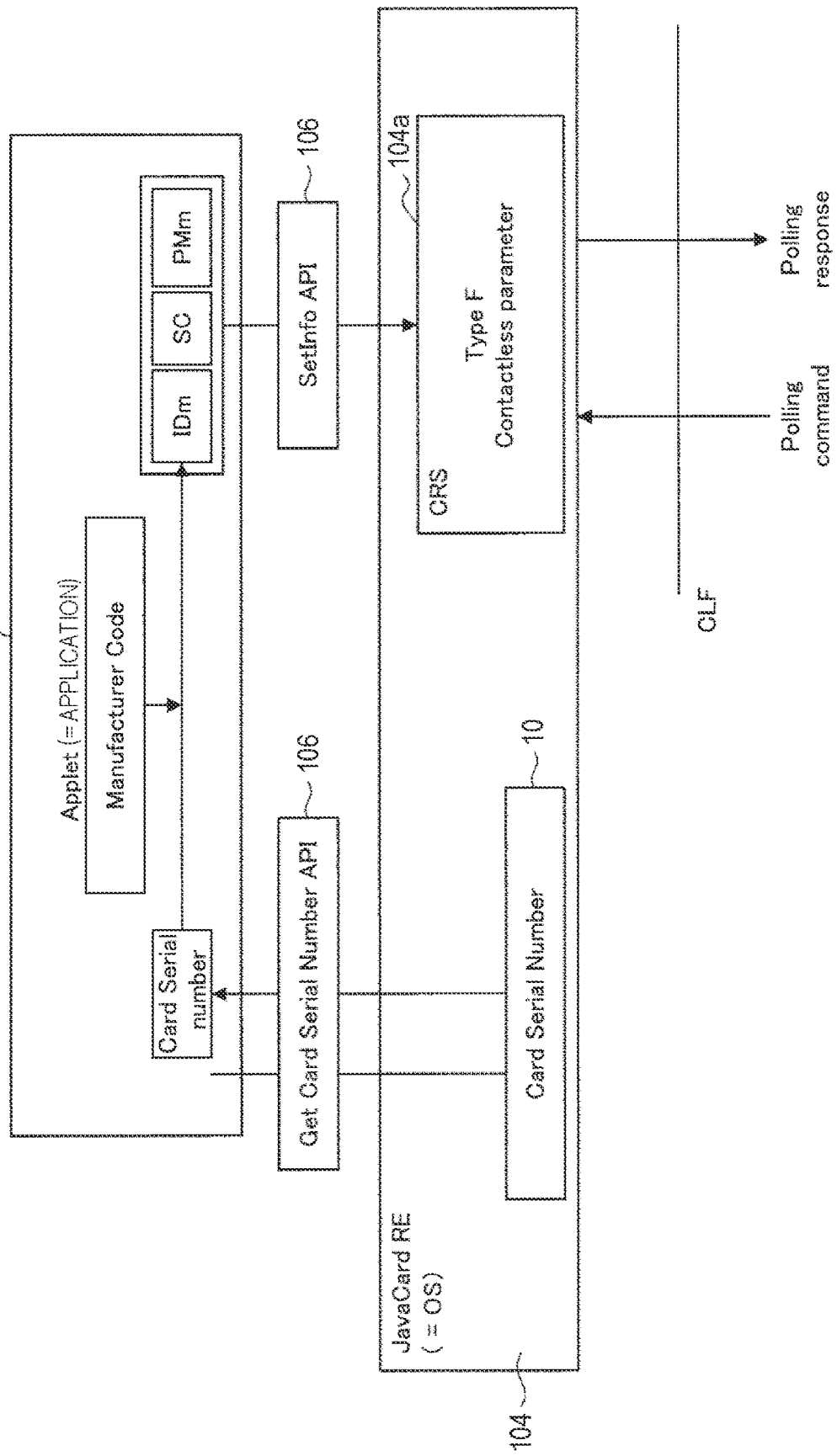
FIG. 8 is a schematic diagram illustrating a procedure for generating the IDm from the UID.

FIG. 8 is a schematic diagram illustrating a procedure for generating the IDm from the UID. A serial number 10 including the UID is stored in the JavaCard OS 104 being the operating system. The serial number 10 is obtained by the applet 108 via the API 106. Therefore, the applet 108 obtains the UID included in the serial number 10. As described above, the UID is set as the unique value in the information processing device.

The applet 108 generates the IDm by removing the first byte UID0 from the UID, and adding the manufacturer code. As described above, by applying the information of UID1 to UID6 to D2 to D7 in the IDm format, respectively, the IDm value may ensure the uniqueness.

Furthermore, the applet 108 adds the system code (SC) and PMm to the IDm and sends the same to the CRS 104a of the JavaCard OS 104 via the API 106. PMm is data for setting a standby time at the time of the polling response. These IDm, SC, and PMm are set as contactless parameters in the CRS 104a.

In this manner, the CRS 104a may generate response data to be returned when the polling command is sent via the CLF 410. When the polling command is sent to the secure element via the CLF 410, the CRS 104a returns the IDm, SC, and PPm as the polling response.

As an example to which the UID and the serial number of this embodiment are applied, there is card production life cycle (CPLC) data defined in a public "Open Platform Card Specification Version 2.0.1". Furthermore, similarly applicable identifiers include Card Serial Number (CSN), Card Image Number (CIN), Integrated Circuit Card Identification (ICCID) and the like. These pieces of information include individually delivered information, information written at once at shipment time and data writing time, vendor identification information, information for identifying the chip and OS and the like. Furthermore, depending on companies, a part of the data serves as the UID. This embodiment is widely applicable to these identifiers.

Regarding management of the serial number, in a case of the secure element illustrated in FIG. 6, there are a case where the serial number is incorporated in an IC chip which is the hardware 100, a case where the serial number is managed by the kernel 102, and a case where the serial number is managed by the JavaCard OS 104. In a case of requiring the uniqueness, it is more convenient to incorporate the serial number in the IC chip because the serial number is fixed. Alternatively, in a case where the serial number is dynamically changed for each phase, there is a case where the serial number may be more flexibly changed by managing the same in an upper layer. In FIG. 6, a layer for managing the serial number is denoted by "SN".

Figure 9:
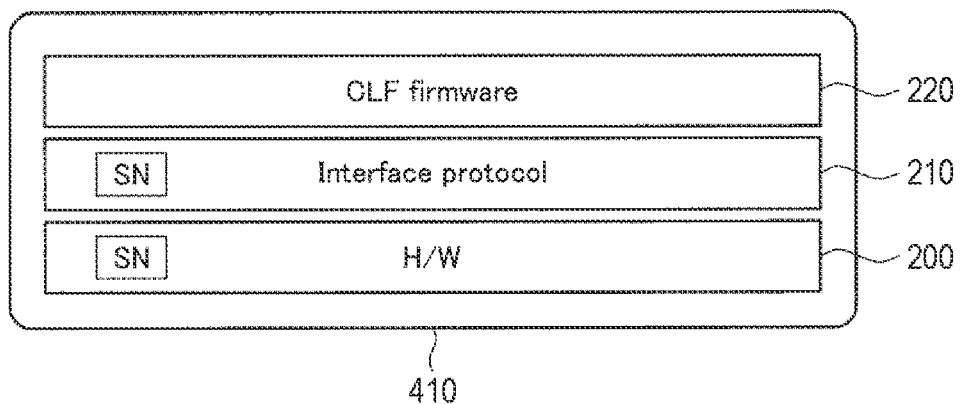
FIG. 9 is a schematic diagram illustrating a configuration of the CLF.

Furthermore, FIG. 9 is a schematic diagram illustrating a configuration of the CLF 410 and corresponds to the example illustrated in FIG. 5E. As illustrated in FIG. 9, in the CLF 410, hardware (H/W) 200, an interface protocol 210, and CLF firmware 220 are layered in this order from a lower layer. The hardware 200 includes a CPU, a memory and the like, and has a configuration in which they are connected to each other via a bus. There are a case where the serial number is incorporated in an IC chip which is the hardware 200 and a case where the interface protocol 210 holds the serial number as information required for RE protocol. As in a case of the SE, in a case of requiring the uniqueness, it is more convenient to incorporate the serial number in the IC chip because the serial number is fixed. Alternatively, in a case where the serial number is dynamically changed for each phase, there is a case where the serial number may be more flexibly changed by managing the same in a protocol layer. Also in FIG. 9, the layer for managing the serial number is denoted by "SN".

In the example described above, the information set in the secure element in the form of the serial number is applicable to the UID used in a communication protocol referred to as Type A, and when the applet 108 may obtain the serial number, the applet 108 converts the serial number and sets the same in the CRS 104a as a contactless parameter for Type F. Therefore, the polling command from the CLF 410 may be included in the polling response to be returned.

In the example described above, an example of generating the IDm using the value of the UID included in the serial number is described; however, the value of the UID may be used without change to be used as data for generating the IDm.

Specifically, by using the serial number as an input of original data of key generation to which a cryptographic algorithm (AES CMAC and the like) is applied as a key derivation function (KDF) or a hash function, it is possible to ensure the uniqueness without directly using the value of the serial number. KDF is defined in NIST SP 800-108, and HMAC or CMAC is described in Chapter 4 Pseudorandom Function (PRF) as an example. Regarding the hash function, there is one capable of generating data of 16 bytes such as MD5 and SHA1, and one that generates data of 32 bytes such as SHA256. Alternatively, the serial number may be used as a seed for random number generation. By using a setSeed method of the JavaCard API to set the serial number as the seed, it is possible to generate a random number that is less likely to be overlapped by utilizing the uniqueness. By performing the above-described calculation on the applet 108 side, the IDm may be changed as appropriate.

Furthermore, since there is an identifier called as a Pseudo-Unique PICC Identifier (PUPI) also in Type B, this may be similarly applied.

Furthermore, although ISO 14443 is described above, it is also possible to divert to an identifier that requires uniqueness at the time of communication such as ISO 15693 Type V (wireless RF), ultra wideband (UWB), Bluetooth (registered trademark) Low Energy (BLE), and Transfer Jet. As an example of ISO 15693 Type V (wireless RF), ubiquitous ID 128-bit (16-byte) fixed value (http://www.mlit.go.jp/seisakutokatsu/jiritsu/siyousho/070323/990_J003.pdf) may be mentioned.

Although the preferred embodiment of the present disclosure is described above in detail with reference to the attached drawings, the technical scope of the present disclosure is not limited to such examples. It as clear that one of ordinary skill in the technical field of the present disclosure may conceive of various modifications or corrections within the scope of the technical idea recited in claims, and it is understood that they also naturally belong to the technical scope of the present disclosure.

Furthermore, the effects described in this specification are merely illustrative or exemplary, and are not limiting. That is, the technology according to the present disclosure may exhibit other effects obvious to those skilled in the art from the description of this specification together with or in place of the effects described above.

Note that, the following configurations also belong to the technical scope of the present disclosure.

(1) An information processing device provided with:

software in which first identification information is registered; and an application that obtains the first identification information from the software, converts the first identification information into second identification information for communication, and registers the second identification information in the software.

(2) The information processing device according to (1) described above, in which the application converts the first identification information into the second identification information by removing a part of information from the first identification information and newly assigning another code prescribed in a format of the second identification information.

(3) The information processing device according to (2) described above, in which the application converts the first identification information into the second identification information by transferring information other than the part of information out of the first identification information to the second identification information without change.

(4) The information processing device according to (2) described above, in which the part of information is identification information that assigns uniqueness under a specific environment by adding the part of information.

(5) The information processing device according to (4) described above, in which the part of information includes identification information numbered for identifying a chip manufacturer, identification information numbered for identifying a company that develops an operation system, identification information numbered for identifying a company that operates a service, identification information numbered for identifying a company entrusted with operation, identification information assigned for identifying an international communication standard, or identification information assigned for providing uniqueness under an environment including a specific country, region, or company.

(6) The information processing device according to any one of (2) to (5) described above, in which information remained after removing the part of information is information for ensuring uniqueness under a specific environment, and is identification information numbered to implement uniqueness by incorporating at least any one of a specific law, a physical law, a physical phenomenon, position information, and time information.

(7) The information processing device according to any one of (1) to (6) described above, in which the software is a JavaCard operation service (OS), and the application registers the second identification information in a contactless registry service that manages contactless information included in the JavaCard OS.

(8) The information processing device according to (7) described above, in which the application registers a system code for identifying a service or identification information for indicating a standby time together with the second identification information in the contactless registry service.

(9) The information processing device according to any one of (1) to (8) described above, in which the application converts the first identification information as original data into predetermined information, and generates the second identification information from the predetermined information.

(10) The information processing device according to any one of (1) to (9) described above, in which the application is downloadable on the software.

(11) The information processing device according to any one of (1) to (10) described above, in which the first identification information and the second identification information have uniqueness.

(12) The information processing device according to any one of (1) to (11) described above, in which the software is an operating system, firmware, or kernel.

(13) An information processing method provided with:

obtaining, from software in which first identification information having uniqueness is registered, the first identification information;

converting the first identification information into second identification information having uniqueness for communication; and registering the second identification information in the software.

(14) A program that allows a computer to serve as:

a means that obtains, from software in which first identification information having uniqueness is registered, the first identification information;

a means that converts the first identification information into second identification information having uniqueness for communication; and a means that registers the second identification information in the software.

REFERENCE SIGNS LIST

104 JavaCard OS
108 Applet
1000 Information processing device

The invention claimed is:

1. An information processing device comprising:
circuitry configured to
  execute software in which first identification information is registered,
  obtain, via an application, the first identification information from the software,
  convert, via the application, the first identification information into second identification information for communication, and
  register, via the application, the second identification information in the software,
wherein the registered second identification information includes a system code specified in a parameter of a command received by the information processing device, and
wherein the application registers the system code for identifying a service and identification information for indicating a standby time together with the second identification information in a contactless registry service.

2. The information processing device according to claim 1, wherein
the application converts the first identification information into the second identification information by removing a part of information from the first identification information and newly assigning another code prescribed in a format of the second identification information.

3. The information processing device according to claim 2, wherein
the application converts the first identification information into the second identification information by transferring information other than the part of information out of the first identification information to the second identification information without change.

4. The information processing device according to claim 2, wherein
the part of information is identification information that assigns uniqueness under a specific environment by adding the part of information.

5. The information processing device according to claim 4, wherein
the part of information includes identification information numbered for identifying a chip manufacturer, identification information numbered for identifying a company that develops an operation system, identification information numbered for identifying a company that operates a service, identification information numbered for identifying a company entrusted with operation, identification information assigned for identifying an international communication standard, or identification information assigned for providing uniqueness under an environment including a specific country, region, or company.

6. The information processing device according to claim 2, wherein
information remained after removing the part of information is information for ensuring uniqueness under a specific environment, and is identification information numbered to implement uniqueness by incorporating at least any one of a specific law, a physical law, a physical phenomenon, position information, and time information.

7. The information processing device according to claim 1, wherein
the software is a JavaCard operation service (OS), and
the application registers the second identification information in the contactless registry service that manages contactless information included in the JavaCard OS.

8. The information processing device according to claim 1, wherein
the application converts the first identification information as original data into predetermined information, and generates the second identification information from the predetermined information.

9. The information processing device according to claim 1, wherein
the application can be downloaded on the software.

10. The information processing device according to claim 1, wherein
the first identification information and the second identification information have uniqueness.

11. The information processing device according to claim 1, wherein
the software includes an operating system, firmware, or kernel.

12. The information processing device according to claim 1, wherein
the service and the standby time are set as contactless parameters in the contactless registry service.

13. An information processing method, implemented via at least one processor, the method comprising:
  obtaining, from software in which first identification information is registered, the first identification information;
  converting the first identification information into second identification information for communication; and
  registering the second identification information in the software,
  wherein the registered second identification information includes a system code specified in a parameter of a command received by the at least one processor, and
  wherein the registered system code identifies a service and identification information for indicating a standby time together with the second identification information in a contactless registry service.

14. A non-transitory computer-readable storage medium having embodied thereon a program, which when executed by a computer causes the computer to execute a method, the method comprising:
  obtaining, from software in which first identification information is registered, the first identification information;
  converting the first identification information into second identification information for communication; and
  registering the second identification information in the software,
  wherein the registered second identification information includes a system code specified in a parameter of a command received by the computer, and wherein the registered system code identifies a service and identification information for indicating a standby time together with the second identification information in a contactless registry service.

* * * * *